(12) United States Patent
van Stolk (10) Patent No.: US 11,430,060 B2
(45) Date of Patent: Aug. 30, 2022

(54) FRACTIONAL SHARES ORDER EXECUTION METHODS

(71) Applicant: DriveWealth Technologies LLC, Chatham, NJ (US)

(72) Inventor: Michael van Stolk, Manasquan, NJ (US)

(73) Assignee: DriveWealth Technologies LLC, Chatham, NJ (US)

( * ) Notice: Subject to any disclaimer, the term of this patent is extended or adjusted under 35 U.S.C. 154(b) by 10 days.

(21) Appl. No.: 15/891,902

(22) Filed: Feb. 8, 2018

(65) Prior Publication Data

US 2018/0225759 A1 Aug. 9, 2018

Related U.S. Application Data

(60) Provisional application No. 62/456,253, filed on Feb. 8, 2017, provisional application No. 62/547,174, filed on Aug. 18, 2017.

(51) Int. Cl.
*G06Q 40/04* (2012.01)
*G06Q 30/08* (2012.01)
(Continued)

(52) U.S. Cl.
CPC ......... *G06Q 40/04* (2013.01); *G06Q 30/0601* (2013.01); *G06Q 30/08* (2013.01); *G06Q 40/06* (2013.01)

(58) Field of Classification Search
USPC ..................................... 705/35, 37
See application file for complete search history.

(56) References Cited

U.S. PATENT DOCUMENTS

| 6,615,188 B1 * | 9/2003 | Breen | G06Q 40/06 705/37 |
| 8,478,675 B1 * | 7/2013 | Walia | G06Q 40/06 705/35 |

(Continued)

OTHER PUBLICATIONS

BuyandHold.com's Low Fees Come With a Significant Catch By Jason Anders The Wall Street Journal Interactive Edition Mar. 9, 2000 (Year: 2000).*

(Continued)

*Primary Examiner* — William E Rankins
(74) *Attorney, Agent, or Firm* — Kramer Levin Naftalis & Frankel LLP (57) ABSTRACT

Methods for executing fractional shares transactions are disclosed. In one aspect, a method for executing a fractional-based buy or sell order may be performed by a fracker processing unit (FPU) configured with an on-hold queue, in-progress queue, fracker balancer, and fractional share database, where a fractional share component of the buy or sell order is subjected to the method. In another aspect, a method for executing a notional-based buy order may be performed by FPU, where an estimated fractional share component of the notional-based buy order is subjected to the method. In another aspect, a method for executing a executing a notional-based sell order may be performed by FPU, where a quantity of an executed whole share component of a notional-based sell order is subjected to the method. In another aspect, a method for executing fractional shares transactions may be performed by in part, providing cleanup account shares to FPU.

8 Claims, 7 Drawing Sheets

(51) Int. Cl.
*G06Q 40/06* (2012.01)
*G06Q 30/06* (2012.01)

(56) References Cited

U.S. PATENT DOCUMENTS

| | | | |
|---|---|---|---|
| 8,595,116 B1* | 11/2013 | Bettinger, II | G06Q 40/06 705/36 R |
| 8,751,359 B2* | 6/2014 | Walia | G06Q 40/06 705/36 R |
| 2001/0034678 A1* | 10/2001 | Lerner | G06Q 40/00 705/35 |
| 2002/0023043 A1 | 2/2002 | Samukawa et al. | |
| 2003/0208432 A1* | 11/2003 | Wallman | G06Q 40/10 705/36 R |
| 2004/0002913 A1 | 1/2004 | Breen et al. | |
| 2005/0131793 A1 | 6/2005 | Hill | |
| 2007/0130043 A1 | 6/2007 | O'Shaughnessy et al. | |
| 2007/0162365 A1 | 7/2007 | Weinreb | |
| 2008/0275806 A1* | 11/2008 | Raitsev | G06Q 10/087 705/37 |
| 2009/0198632 A1 | 8/2009 | Dillahunty | |
| 2010/0205080 A1 | 8/2010 | Freitas et al. | |
| 2012/0054082 A1 | 3/2012 | Al-Saadi | |
| 2013/0066802 A1 | 3/2013 | Sheldon | |
| 2013/0080351 A1* | 3/2013 | Schneider | G06Q 40/04 705/36 R |
| 2013/0198106 A1 | 8/2013 | Walia et al. | |
| 2014/0279688 A1* | 9/2014 | Ginsberg | G06Q 40/06 705/36 R |
| 2015/0302523 A1 | 10/2015 | Shaul | |
| 2016/0005121 A1* | 1/2016 | Kapoor | G06Q 40/04 705/37 |
| 2017/0140411 A1* | 5/2017 | Lele | G06Q 40/04 |

OTHER PUBLICATIONS

Handa et al., Limit Order Trading, 1994, (retrieved on May 23, 2018, retrieved from the internet: URL:http://archive.nyu.edu/bitstream/2451/27249/2/wpa94035.pdf.
International Search Report, PCT Application No. PCT/US2018/017417, international filing date Feb. 8, 2018, dated Jun. 11, 2018.
International Preliminary Reporton Patentability Application No. PCT/US2018/017417, International Filing Date Feb. 8, 2018, dated Jun. 11, 2018.
Extended European Search Report Application No. 18750713.2, dated Jul. 9, 2020.
JP Office Action dated Sep. 21, 2021 (in Japanese and English translation).

* cited by examiner

FRACTIONAL SHARES ORDER EXECUTION METHODS

CROSS-REFERENCE TO RELATED APPLICATION

This application claims priority to U.S. Provisional Application No. 62/456,253 entitled "Fractional Shares Trading System and Method" filed on Feb. 8, 2017, and U.S. Provisional Application No. 62/547,174 entitled "Hybrid Facilitation Account System and Methods" filed on Aug. 18, 2017, both of which are incorporated by reference.

BACKGROUND

The present invention relates to methods for mitigating, on a real-time basis, exposure of a fractional inventory account and eliminating implicit barriers to entry for notional-based (i.e., currency-based) buy or sell orders of securities. The invention further relates to a system for ensuring that clients will not overbuy or oversell when dealing in notional amounts, thereby providing more efficient order handling.

Fractional shares are a share of equity that is less than one full share. Fractional shares usually come about from stock splits, dividend reinvestment funds (DRIPs) and similar corporate actions. Normally, fractional shares cannot be acquired from the market, and while they have value to the investor, they can be difficult to sell.

Generally, brokerage firms do not have a way to manage their fractional inventory positions to hold, on a real-time basis, no more inventory than is required to satisfy all existing orders. Existing methods are not designed around micro investing. Equity orders may need to be "batched" or purchased and held as whole share inventory positions, anticipating a future need. Batch orders are a passive form of investing and are not active and real-time, and thus do not provide or meet best execution requirements.

Predicting an inventory of equities required to satisfy a dynamic number of client orders based on past trading activity increases the number of proprietary orders to the "street" and the number of securities that a brokerage firm would need to take a position in to facilitate the execution of a fractional share trading program on behalf of its clients. This increases the firm's cost of trading, and its risk exposure in its inventory account with respect to intraday price fluctuations.

Generally, brokerage firms do not have a way to ensure that clients' notional orders do not exceed their requested buy or sell amounts. Trading methods and systems are not set up for real-time micro-investing, thereby creating issues when attempting to split whole shares into fractional components while adding significant costs to the brokerage firm and its clients.

Generally, brokerage firms do not have a way to provide real-time allocations, at the micro investing level, to managed accounts. As stated above, methods of fractional share trading may require firms to either batch orders or purchase whole share positions. Drift in portfolio allocations are not easily or efficiently accounted for in portfolio allocations. For example, a client with a desired portfolio with 70% weighted in a first equity and 30% weighted in a second equity will deviate from the desired weighting based on market fluctuations. Generally, rebalancing occurs at the end of the day or at predetermined intervals. At that time, the portfolio may be rebalanced close to the client's desired portfolio of 70/30, but not precisely due to existing fractional share limitations.

Generally, brokerage firms do not have a method for accounting for "dribble" (i.e. the remaining fractional component of shares which cannot be allocated to the subaccounts). Existing methods could require that the fractional component remain in the brokerage firm's proprietary account until a full share can be accumulated, unable to make adjustments at a micro level. Even then, there can still be a new fractional component remaining after the full share is sold.

SUMMARY

Embodiments of the inventive concepts disclosed herein are directed to methods that may (1) provide improved systems and management of fractional inventory in real-time, (2) improve systems and methods for transacting fractional share components, (3) improve systems and methods for efficiently executing fractional share transactions as it relates to originating notional orders while taking into consideration movement in market price throughout the lifecycle of the transaction, (4) improve systems and methods for allocating fractional share components to managed accounts, and (5) improve systems and method for conducting securities transactions in notional amounts in such a way that buy or sell orders do not exceed their requested amounts.

In one aspect, embodiments of the inventive concepts disclosed herein are directed to a method for executing a fractional-based buy or sell order. When properly configured, a fracker processing unit (FPU) may receive a fractional share component of a buy or sell order; provide the fractional share component to a first queue; provide the fractional share component to a second queue upon an execution of a whole share component; and perform the buy or sell order of the fractional share component employing, in part, a fractional share database.

In a further aspect, embodiments of the inventive concepts disclosed herein are directed to a method for executing a notional-based buy order. When properly configured, the FPU may receive an estimated fractional share component of a notional-based buy order; provide the estimated fractional share component to a first queue; recalculate a quantity of the estimated fractional share component; provide the recalculated, estimated fractional share component to a second queue upon an execution of an estimated whole share component; execute a buy of fractional shares from the fractional shares database if a sufficient quantity is stored; recalculate a second estimated fractional share component; and adjust the second estimated fractional share component as a function of the first amount.

In a further aspect, embodiments of the inventive concepts disclosed herein are directed to a method for executing a notional-based sell order. When properly configured, the FPU may receive a quantity of an executed whole share component of a notional-based sell order; calculate a second amount of the executed whole share component; perform a first transaction if an oversell condition exists; and perform a second transaction if an oversell condition does not exist.

In a further aspect, embodiments of the inventive concepts disclosed herein are directed to a method for executing fractional shares transactions in managed accounts. When properly configured, an account processing unit may receive a report indicative of an execution of a trade order of funds or securities; determine an allocation of the executed funds or securities; provide a first portion of the executed funds or securities capable of being allocated pursuant to an allocation listing to one or more first subaccounts; and provide a second portion of the executed funds or securities, if any, not capable of being accounted to one or more second subaccounts (e.g., cleanup accounts), whereupon the executed funds or securities in the one or more second subaccounts become available for purchase by FPU.

DETAILED DESCRIPTION

In the following description, several specific details are presented to provide a thorough understanding of embodiments of the inventive concepts disclosed herein. One skilled in the relevant art will recognize, however, that embodiments of the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1:
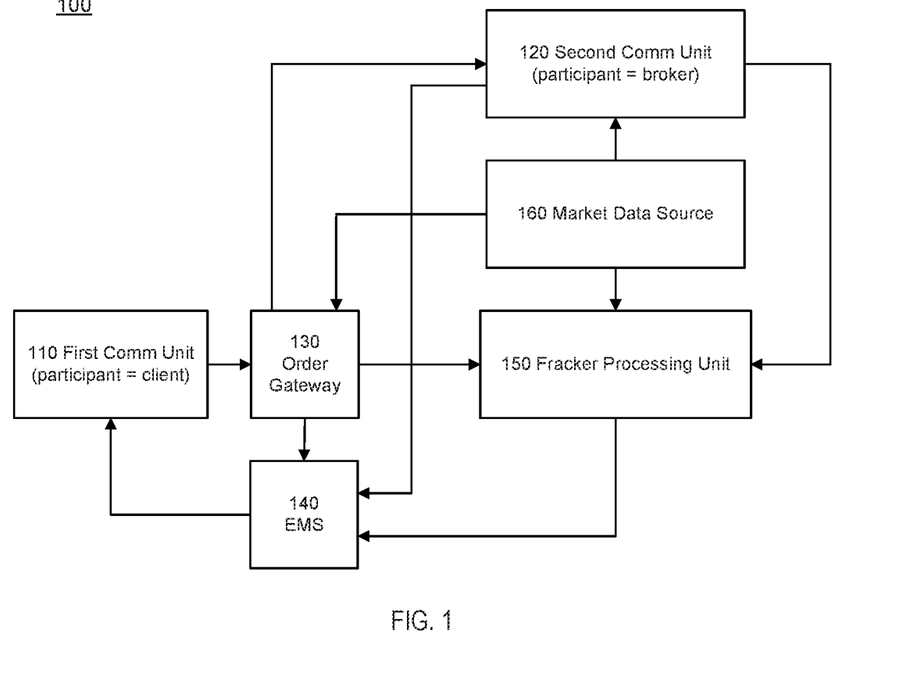
FIG. 1 depicts a functional block diagram of a quantity-based and notional-based order executing system according to the inventive concepts disclosed herein.

Referring now to FIG. 1, an embodiment of a quantity-based and notional-based order executing system 100 suitable for implementation of the inventive concepts described herein includes a first communications unit 110, a second communications unit 120, an order gateway 130, an execution management system (EMS) 140, a fracker processing unit (FPU) 150, and a market data source 160.

First communications unit 110 and second communications unit 120 may include one or more communications devices/systems each employed by a first and second participants, respectively, and configured to communicate with other components of system 100 including, but not limited to, order gateway 130, EMS 140, and FPU 150. In some embodiments, first and second participants could include, but are not limited to, individuals, entities, street broker executing an agency side of a whole share component, and/or other financial institutions. It should be noted that, although FIG. 1 depicts a single first communications unit 110 of a first participant and a single second communications unit 120 of a second participant, each of these may be representative of two or more communications units of two or more participants having different locations; that is, a first communications unit 110 communicatively coupled with order gateway 130 and a first communications unit 110 communicatively coupled with EMS 140, and a second communications unit 120 communicatively coupled with order gateway 130 and a second communications unit 120 communicatively coupled FPU 150 may be each be owned and/or operated by different first and second participants having different locations.

Order gateway module 130 could include any module configured to accept quantity-based and/or notional-based request including buy and/or sell orders. In some embodiments, quantity-based orders could include orders for whole number shares (e.g., 1 share, 50 shares, 200 shares, etc. . . . ) and fractional-based orders could include orders comprised of a whole number component and a fraction component (e.g., 1.5000 shares, 50.6667 shares, 200.0001 shares, etc. . . . ). In some embodiments, notional-based orders could be those stated in a notional value (e.g., $500.00 USD (Unites States dollars) of a security).

Order gateway module 130 could act as a primary risk manager for all order types. In some embodiments, order gateway module 130 could run a series of risk queries and checks based upon various inputs and risk thresholds established by the brokerage firm. In some embodiments, order gateway module 130 could be configured with a smart order routing system that recognizes whether to (a) reject the trade and return a response to the first participant based upon risk management outcomes, (b) forward the request directly to the second participant for execution, or (c) forward the request to FPU 150.

Figure 2:
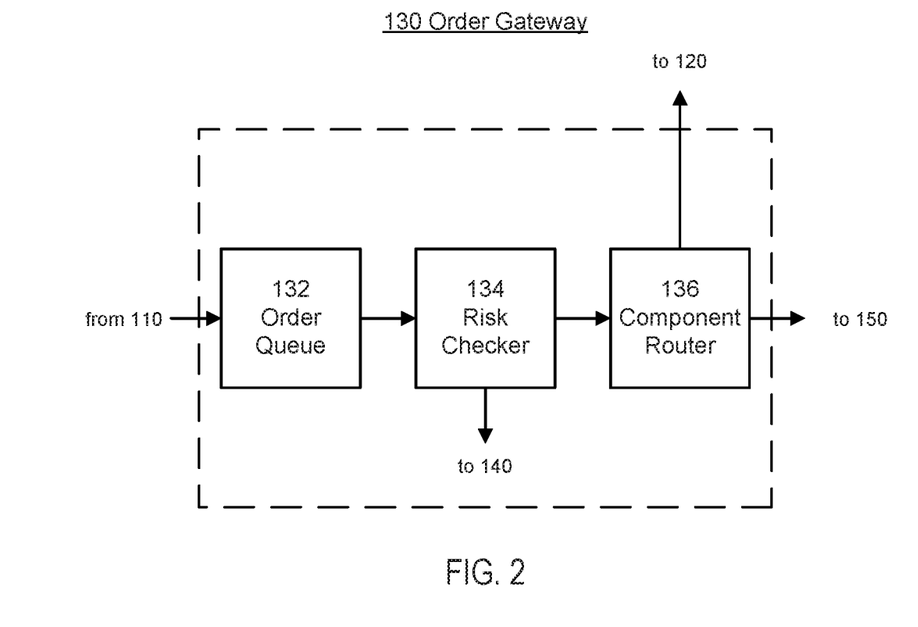
FIG. 2 depicts an order gateway according to the inventive concepts disclosed herein.

Referring now to FIG. 2, order gateway module 130 could include an order queue 132, a risk checker 134, and a component router 136. Order queue 132 could be configured to begin an onboarding process by receiving one or more orders provided by first communications unit 110. Order queue 132 could be configured to process any or all of these orders on a first-in, first-out (FIFO) basis. In some embodiments, these orders could include a quantity-based buy order, a quantity-based sell order, a notional-based buy order, and/or a notional-based sell order. Once received, an order may be provided to risk checker 134 to subject the order to one or more internal risk checks.

Risk checker 134 could include a module configured to subject the order to a risk management plan including one or more internal risk checks. In some embodiments, the internal risk checks could include "account rules," "customer profile information," "approved securities list," and/or "notional value and estimated quantity conversions."

"Account rules" could include rules based upon the type of account and permitted activity from a regulatory standpoint. For example, a rule could prohibit a "short" transaction from being executed in an individual retirement account (IRA).

"Customer profile information" could include information acquired from an internal database during an account onboarding process. In some embodiments, customer profile information could be integrated into risk-based checks to assess, for example, whether the account has sufficient buying power to execute the transaction contemplated.

"Approved securities list" could include baseline securities approved for trading on a trading platform. The list can be modified based upon a counterparty, where some counterparties may offer only a limited subset of the full universe of securities included on an approved securities list.

"Notional value and estimated quantity conversions" could include instructions to convert a notional-based order into an estimated quantity of shares and utilize those calculations to determine whether there are sufficient funds in the account. In some embodiments, a real-time price and/or NBBO price provided by market data source 160 may be used for the estimation.

Component router 136 could include a module configured with instructions to recognize whether to reject or allow the order and present it for subsequent execution. In some embodiments, component router 136 could report a rejection of the order to EMS 140 (e.g., an unfavorable risk management outcome) which, in turn, could report a rejection of the order to first communications unit 110. In some embodiments, the quantity of shares of a fractional-based order could be divided into a whole share component and a fractional share component, where the whole and fractional share components may be routed/provided to second market participant 120 for execution on an agency basis and the FPU 150 for execution on a principal basis, respectively, where agency trading and principal trading are trading methods known to those skilled in the art. In some embodiments, the estimated quantity of shares of a notional-based order could be divided into an estimated whole share component and an estimated fractional share component, where the estimated whole and fractional share components may be routed/provided to second market participant 120 and the FPU 150, respectively.

Referring back to FIG. 1, EMS 140 may be configured to provide reports to first communications unit 110. In some embodiments, EMS 140 may be configured to receive responses provided by order gateway module 130, second participant 120, and/or FPU 150.

Figure 3:
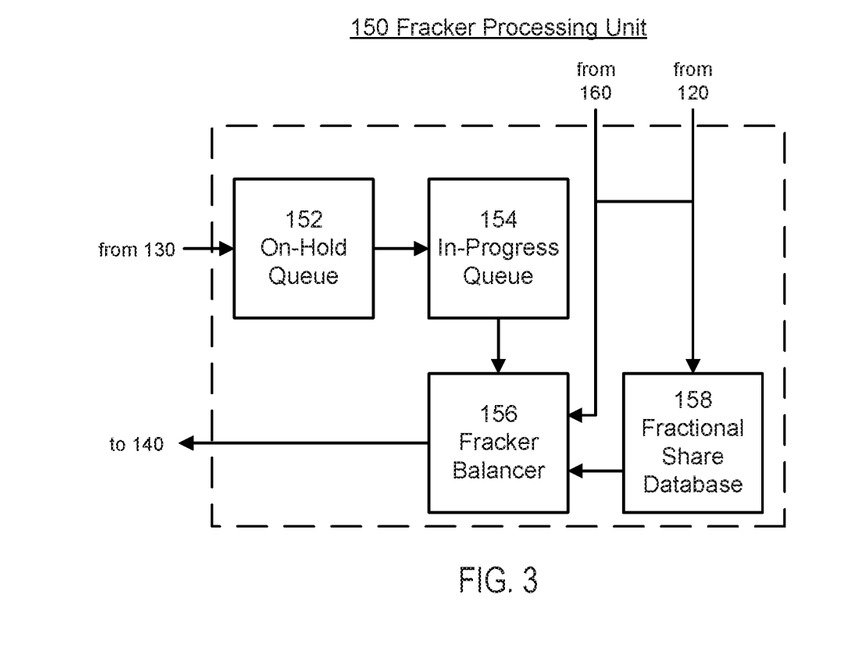
FIG. 3 depicts a fracker processing unit according to the inventive concepts disclosed herein.

Referring now to FIG. 3, FPU 150 may include an on-hold queue 152, an in-progress queue 154, fracker balancer 156, and/or fractional share database 158. FPU 150 may be configured as a primary engine for executing instructions for fractional share trading. FPU 150 and/or APU 510 (discussed below) could include any electronic data processing unit which executes software or computer instruction code that could be stored, permanently or temporarily, in a digital memory storage device or a non-transitory computer-readable media including, but not limited to, random access memory (RAM), read-only memory (ROM), compact disc (CD), hard disk drive, diskette, solid-state memory, secure digital cards, and compact flash cards. FPU 150 and/or APU 510 may be driven by the execution of software or computer instruction code containing algorithms developed for the specific functions embodied herein. FPU 150 and/or APU 510 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, FPU 150 and/or APU 510 could also include more than one electronic data processing unit. In some embodiments, the FPU 150 and/or APU 510 could be a processor(s) used by or in conjunction with any other system including, but not limited to, order gateway module 130, EMS 140, and/or managed account system 500 (discussed below).

In some embodiments, the terms "programmed" and "configured" are synonymous. FPU 150 and/or APU 510 may be electronically and/or communicatively coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a bus, through a wireless network, or as a signal received and/or transmitted by the FPU 150 and/or APU 510 via a physical or a virtual computer port. FPU 150 and/or APU 510 may be programmed or configured to execute the method discussed in detail below. In some embodiments, FPU 150 may be programmed or configured to receive data from various systems and/or units including, but not limited to, second participant 120, and/or market data source 160; APU 510 may be programmed or configured to receive data from various systems and/or units including, but not limited to, EMS 140.

Referring again to FIG. 3, on-hold queue 152 may be configured to receive one or more fractional share components from order gateway module 130 including, but not limited to fractional share components and estimated fractional share components. In some embodiments, on-hold queue 152 may be configured to provide one fractional share component to in-progress queue 154. In some embodiments, such one fractional share component could be located at the top of the queue when on-hold queue 152 is configured to process fractional share components on a FIFO basis.

In-progress queue 154 could be configured to receive a fractional share component from on-hold queue 152. In some embodiments, the fractional share component in in-progress queue 154 could be executed by fracker balancer 156 as disclosed by methods in detail below.

Fracker balancer 156 could be a module configured to execute the fractional share component(s) on a principal basis. In some embodiments, fracker balancer 156 could be configured with user imposed parameters that could include controls to adjust and set inventory risk exposure. Essentially, a user may elect to hold more than one share of a given security in fractional share database 158. This could allow FPU 150 to trade more efficiently in time of high demand. The baseline is to hold no more than what is necessary to execute current orders. Based on this parameter, fracker balancer 156 may buy or sell shares held in the fractional share database 158.

Referring back to FIG. 1, market data source 160 could include any source of market data representative of real-time market feeds. Both order gateway 130 and FPU 150 could consume the National Best Bid or Offer (NBBO) price feed in order to meet Regulation National Market System (Reg-NMS) requirements and/or any governing authority when executing their respective functions, where RegNMS is a financial regulation promulgated and described in the United States (US) by the US Securities and Exchange Commission (SEC) as "a series of initiatives designed to modernize and strengthen the NMS for equity securities." The RegNMS is intended to assure that investors receive the best price executions for their orders by encouraging competition in the marketplace.

Figure 4:
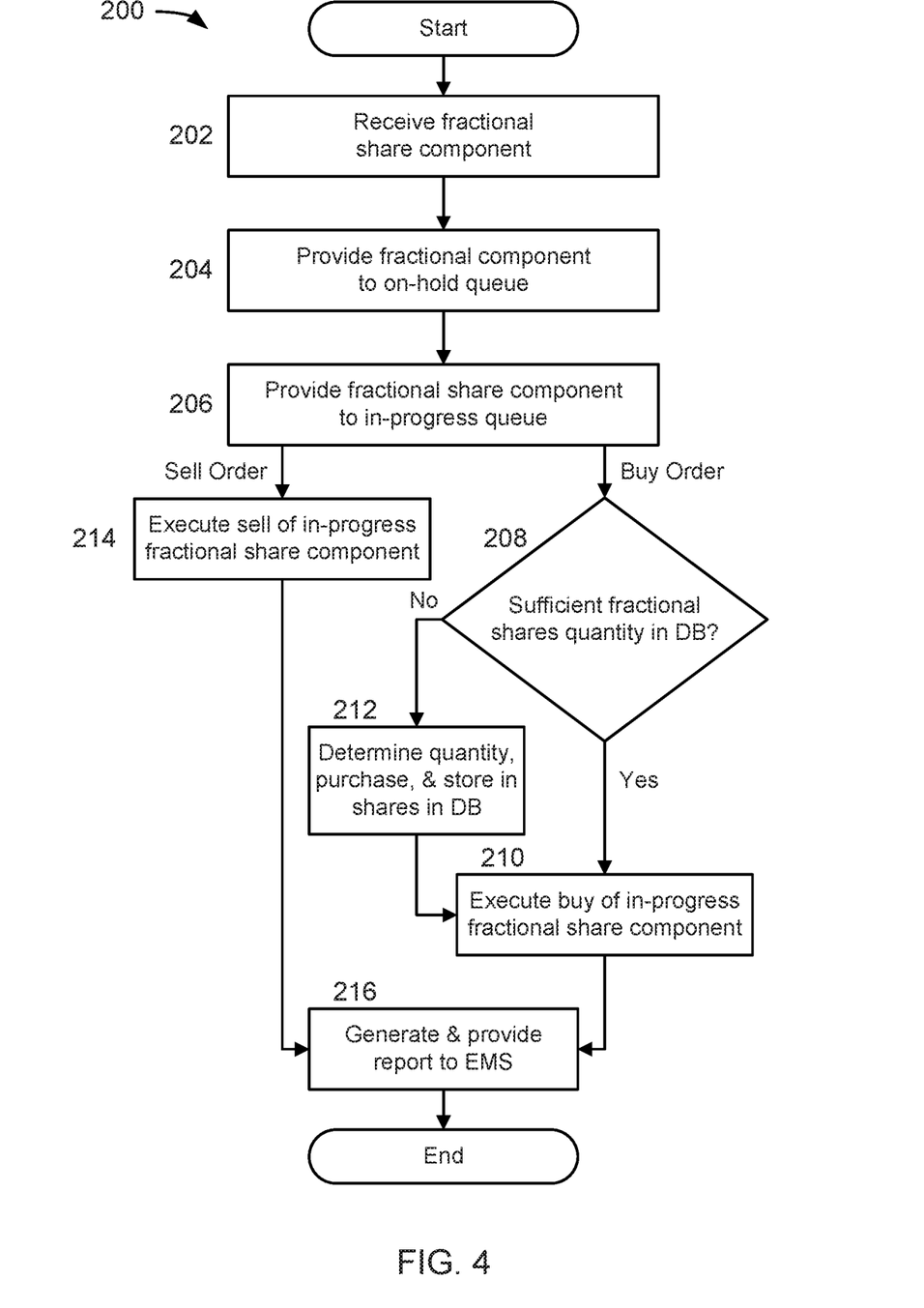
FIG. 4 depicts an exemplary embodiment of a flowchart disclosing a method for executing a fractional-based buy or sell order according to the inventive concepts disclosed herein.
Figure 5:
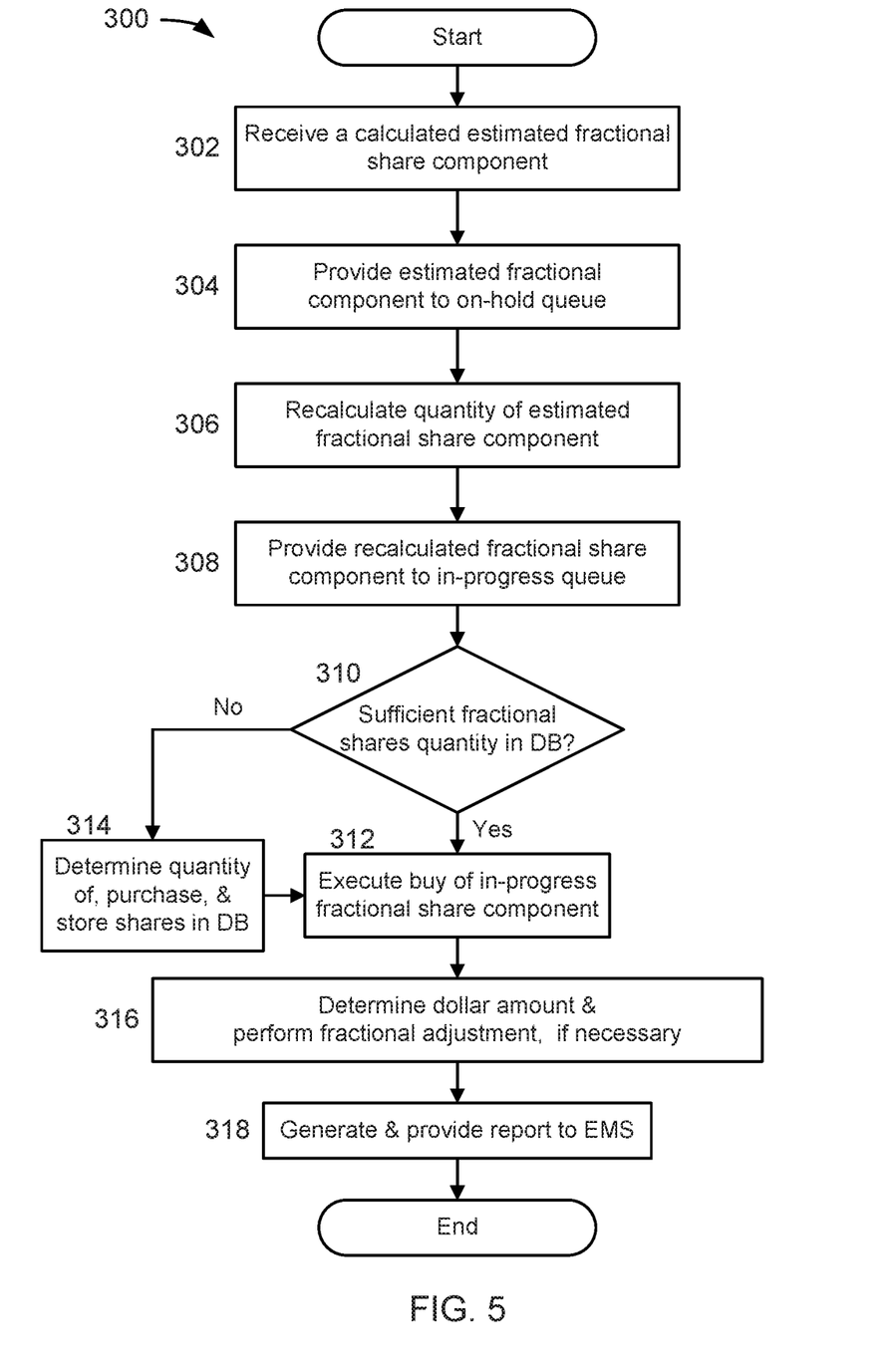
FIG. 5 depicts an exemplary embodiment of a flowchart disclosing a method for executing a notional-based buy order according to the inventive concepts disclosed herein.
Figure 6:
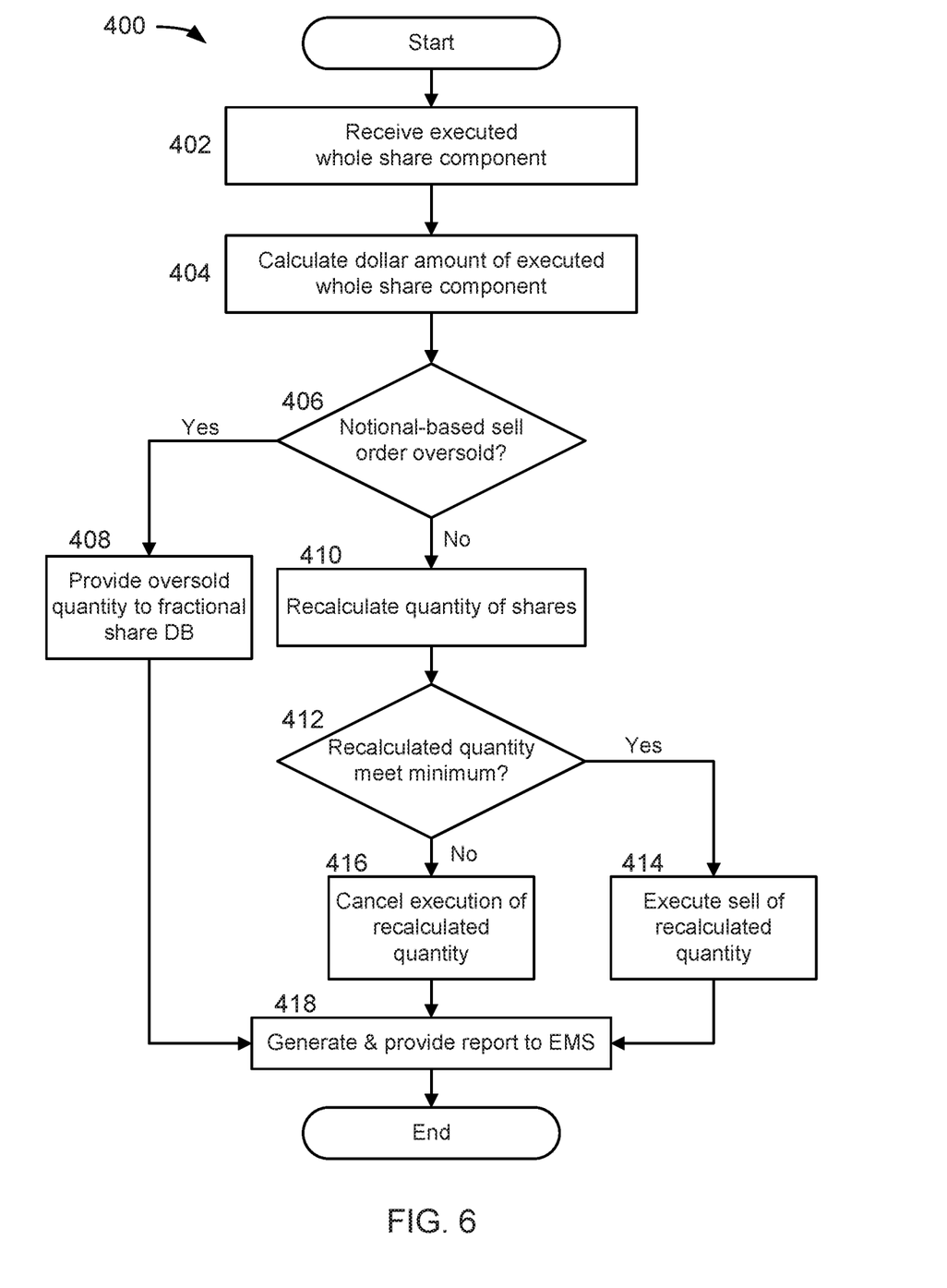
FIG. 6 depicts an exemplary embodiment of a flowchart disclosing a method for executing a notional-based sell order according to the inventive concepts disclosed herein.

Referring now to FIGS. 4 through 6, flowcharts 200 through 400 disclose examples of methods for executing fractional-based and/or notional-based trades, where FPU 150 may be programmed or configured with instructions corresponding to the modules embodied in the flowcharts. In some embodiments, FPU 150 may be a processor or a combination of processors found in, for example, order gateway module 130 and/or EMS 140, or any other system suitable for performing the task. Also, FPU 150 may be a processor of a module such as, but not limited to, a printed circuit card having one or more input interfaces to facilitate the two-way data communications of FPU 150, i.e., the receiving and providing of data. As necessary for the accomplishment of the following modules embodied in the flowcharts, the acquiring of data is synonymous and/or interchangeable with the receiving and/or retrieving of data, and the providing of data is synonymous and/or interchangeable with the making available or supplying of data.

FIG. 4 depicts flowchart 200 disclosing an example of a method for executing a fractional-based buy or sell order, where FPU 150 may be programmed or configured with instructions corresponding to the modules embodied in flowchart 200. The method of flowchart 200 begins with module 202 with FPU 150 receiving a fractional share component provided by order gateway module 130. In some embodiments, first communications unit 110 could have provided a fractional-based buy or sell order originating from the first participant to order gateway module 130 which, in turn, separated the quantity of the order into the fractional share component and corresponding whole share component, the latter of which being provided to second communications unit 120 for a buy or sell execution of the whole share component by the second participant on an agency basis.

The method of flowchart 200 continues with module 204 with FPU 150 providing the fractional share component to on-hold queue 152. In some embodiments, the fractional share component may be placed at the bottom of on-hold queue 152 when the queue is already populated with other fractional share components received from preceding orders, applying FIFO basis to on-hold queue 152.

The method of flowchart 200 continues with module 206 with FPU 150 providing the fractional share component to in-progress queue 154 after its corresponding whole share component has been executed by second communications unit 120 at a first price and/or a first report regarding the execution has been generated and provided to EMS 140 for subsequent delivery to the first participant via first communications unit 110. The first price may be provided to FPU 150. In some embodiments, in-progress queue 154 may receive the fractional share component when it has reached the top of the on-hold queue after the preceding fractional share components have been processed by in-progress queue 154.

The method of flowchart 200 continues with module 208 or module 214, depending on if the order is a buy or sell order. For a buy order, the method of flowchart 200 continues with module 208; for a sell order, the method of flowchart 200 continues with module 214.

Continuing with module 208, fracker balancer 156 may determine whether fractional share database 158 has a sufficient quantity to process the quantity of the fractional share component in in-progress queue 154.

Where there is a sufficient quantity, the method of flowchart 200 continues with module 210 with fracker balancer 156 executing the fractional share component at the first price. In some embodiments, the execution may be performed at a real-time NBBO (i.e., second price) if there is a price improvement (i.e., the NBBO price is lower than the first price). Then, the method of flowchart 200 proceeds to module 216.

Where there is not a sufficient quantity, the method of flowchart 200 continues with module 212 with fracker balancer 156 determining a quantity of share(s) for purchase from the market, receiving the share(s), and storing the share(s) in fractional share database 158. In some embodiments, the quantity of share(s) may be determined by adding together the quantities in both the in-progress queue 154 and on-hold queue 152. Then, the method of flowchart 200 proceeds to module 210.

Continuing from module 206, the method of flowchart 200 continues with module 214 with fracker balancer 156 executing the fractional share component at the first price or, if there is an improvement, the second price.

The method of flowchart 200 continues with module 216 with fracker balancer 156 generating a second report about the execution of the fractional share component. In some embodiments, the second report may be generated by fracker balancer 156 and provided to EMS 140 for subsequent delivery to the first participant via first communications unit 110. Then, the method of flowchart 200 ends.

FIG. 5 depicts flowchart 300 disclosing an example of a method for executing a notional-based buy order, where FPU 150 may be programmed or configured with instructions corresponding to the modules embodied in flowchart 300. The method of flowchart 300 begins with module 302 with FPU 150 receiving a first estimated fractional share component provided by order gateway module 130. In some embodiments, first communications unit 110 could have provided a notional-based buy order originating from the first participant to order gateway module 130 which, in turn, calculated an estimated quantity of the order and converted the estimated quantity into the first estimated fractional share component and corresponding estimated whole share component, the latter of which being provided to second commutation unit 120 for a sell execution of the estimated whole share component by the second participant.

The method of flowchart 300 continues with module 304 with FPU 150 providing the first estimated fractional share component to on-hold queue 152. In some embodiments, the first estimated fractional share component may be placed at the bottom of on-hold queue 152 when the queue is already populated with other fractional share components received from preceding orders applying a FIFO basis to on-hold queue 152.

The method of flowchart 300 continues with module 306 with FPU 150 recalculating the quantity of the first estimated fractional share component after its corresponding estimated whole share component has been executed by second communications unit 120 at a first price and/or a first report regarding the execution has been generated and provided to EMS 140 for subsequent delivery to the first participant via first communications unit 110; the first price may be provided to FPU 150. In some embodiments, the recalculation may be performed at a real-time NBBO (i.e., second price). In some embodiments, the recalculation may be performed when the estimated fractional share component has reached the top of on-hold queue 152 after the preceding fractional share components have been processed by in-progress queue 154.

The method of flowchart 300 continues with module 308 with FPU 150 providing a second fractional share component comprised of the recalculated quantity to in-progress queue 154.

The method of flowchart 300 continues with module 310 with fracker balancer 156 determining whether fractional share database 158 has a sufficient quantity to process the quantity of the second fractional share component in in-progress queue 154.

Where there is sufficient quantity, the method of flowchart 300 continues with module 312 with fracker balancer 156 executing the second fractional share component at the first price or, if there is an improvement, a real-time NBBO. Then, the method of flowchart 300 proceeds to module 316.

Where there is not a sufficient quantity, the method of flowchart 300 continues with module 314 with fracker balancer 156 determining a quantity of share(s) for purchase from the market, receiving the share(s), and storing the share(s) in fractional share database 158. In some embodiments, the quantity of share(s) may be determined by adding together the quantities in both the in-progress queue 154 and on-hold queue 152. Then, the method of flowchart 300 proceeds to module 312.

Continuing from module 312, the method of flowchart 300 continues with module 316 with fracker balancer 156 determining a dollar amount of the second fractional share component executed in module 312. In some embodiments, an adjustment factor may be determined when the dollar amount is greater than the dollar amount of the notional-based buy order; if so, the share quantity may be reduced to make the dollar amount of the second factional share component equal to or slightly less than the dollar amount of the notional-based buy order to prevent an overbuy.

The method of flowchart 300 continues with module 318 with fracker balancer 156 generating a second report about the execution of the first estimated fractional share component of module 302. In some embodiments, the second report may be generated by fracker balancer 156 and provided to EMS 140 for subsequent delivery to the first participant via first communications unit 110. Then, the method of flowchart 300 ends.

FIG. 6 depicts flowchart 400 disclosing an example of a method for executing a notional-based sell order, where FPU 150 may be programmed or configured with instructions corresponding to the modules embodied in flowchart 400. The method of flowchart 400 begins with module 402 with FPU 150 receiving a quantity of an executed whole share component provided by order gateway module 130, where the executed whole share component may be a quantity of a whole share component resulting from a conversion of a notional-based sell order of a dollar amount received via first communications unit 110 and provided to second communications unit 120 for the execution at a first price.

The method of flowchart 400 continues with module 404 with FPU 150 calculating of a dollar amount of the executed whole share component. In some embodiments, the calculation may be performed at a real-time NBBO (i.e., second price).

The method of flowchart 400 continues with module 406 with FPU 150 determining whether the notional-based sell order has been oversold. In some embodiments, an oversold condition may occur when the dollar amount of the quantity of the executed whole share component exceeds the dollar amount of the notional-based sell order.

When an oversold condition exists, the method of flowchart 400 continues with module 408 with fracker balancer 156 providing a quantity of the executed whole share component commensurate to the oversell to fractional share database 158. Then, the method of flowchart 400 proceeds to module 418.

When an oversold condition does not exist, the method of flowchart 400 continues with module 410 with fracker balancer 156 recalculating a quantity of share(s) commensurate to a difference in the dollar amount of the notional-based sell order and the calculated dollar amount of the executed whole share component. In some embodiments, the calculation may be performed at a real-time NBBO (i.e., a third price).

The method of flowchart 400 continues with module 412 with fracker balancer 156 determining whether the recalculated quantity of share(s) meets a minimum quantity required for execution.

When the minimum quantity has been met, the method of flowchart 400 continues with module 414 with fracker balancer 156 executing a sell of the recalculated quantity of share(s) at the third price. Then, the method of flowchart 400 proceeds to module 418.

When the minimum quantity has not been met, the method of flowchart 400 continues with module 416 with fracker balancer 156 cancelling an execution on the recalculated quantity of share(s) and returning the dollar amount commensurate to the recalculated quantity of share(s) to EMS 140.

The method of flowchart 400 continues with module 418 with fracker balancer 156 generating a report regarding the execution performed in modules 408 or 414 of the cancellation performed in module 416. In some embodiments, the report may be generated by fracker balancer 156 and provided to EMS 140 for subsequent delivery to the first participant via first communications unit 110. Then, the method of flowchart 400 ends.

Figure 7:
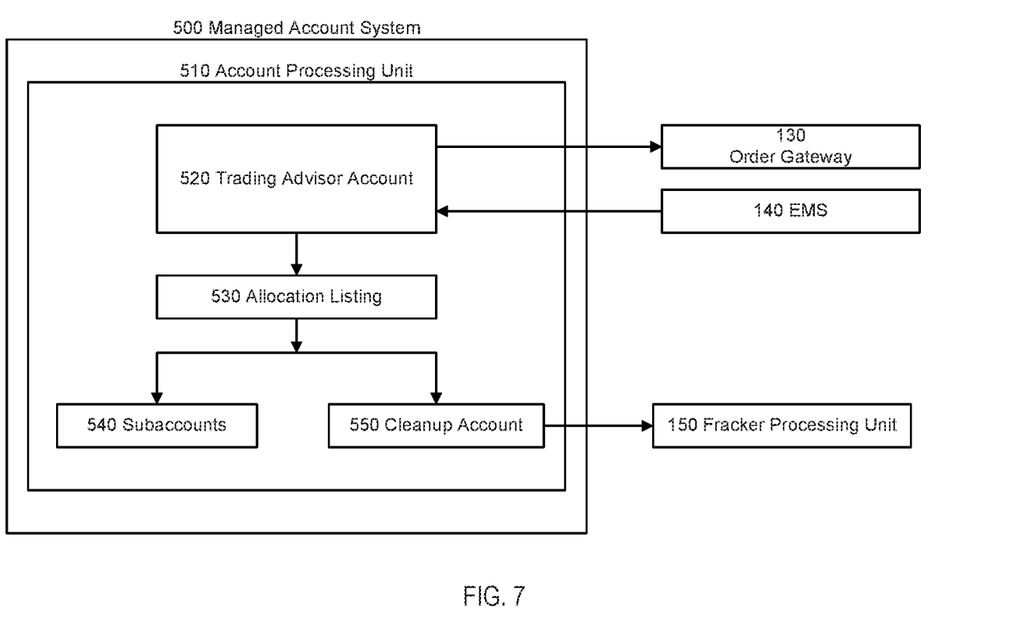
FIG. 7 depicts a functional block diagram of a managed account system according to the inventive concepts disclosed herein.

Referring now to FIG. 7, a managed account system (MAS) 500 could be an account of an individual and/or entity such as, but not limited to, a registered investment advisor (RIA) and may include an account processing unit (APU) 510 communicatively coupled to order gateway 130 and/or EMS 140, a trading advisor account 520, an allocation listing 530, subaccounts 540, and a cleanup account 550. In some embodiments, MAS 500 could be employed by a first participant owning and/or operating first communications unit 110 communicatively coupled to order gateway 130, EMS 140, and/or FPU 150 as shown.

Trading advisor account 520 could be a module configured to calculate an amount of funds and/or securities available for trading, in aggregate, by subaccounts 540. The individual and/or entity may originate an order with trading advisor account 520. In some embodiments, the order may be a quantity-based order. In some embodiments, the order may be a notional-based order. After an order has been originated, trading advisor account 520 may be configured to provide the order to order gateway 130. After the order is executed, trading advisor account 520 may be configured to receive a report of the execution provided by EMS 140.

Allocation listing 530 could include a module configured to inform trading advisor account 520 to what subaccount of subaccounts 540 the funds and/or securities capable of being fracked are allocated. Subaccounts 540 could include a module configured to receive funds and/or securities that are capable of being allocated and fracked.

Cleanup account 550 could include a module configured to receive funds and/or securities that are not capable of being allocated or fracked. In some embodiments, FPU 150 could be configured to buy or sell fractional components of funds and/or securities from cleanup account 550 in order to liquidate such account. In some embodiments, these fractional components could be bought or sold on a scheduled interval (e.g., at the close of a trading day, prior to an opening of a trading day, etc.), whereby the fractional positions held in cleanup account 550 of the individual and/or entity may be reduced to zero. Currently firms do not have a way of doing this at the micro level until accumulating a full share which still will likely result in some fractional component being left over.

Figure 8:
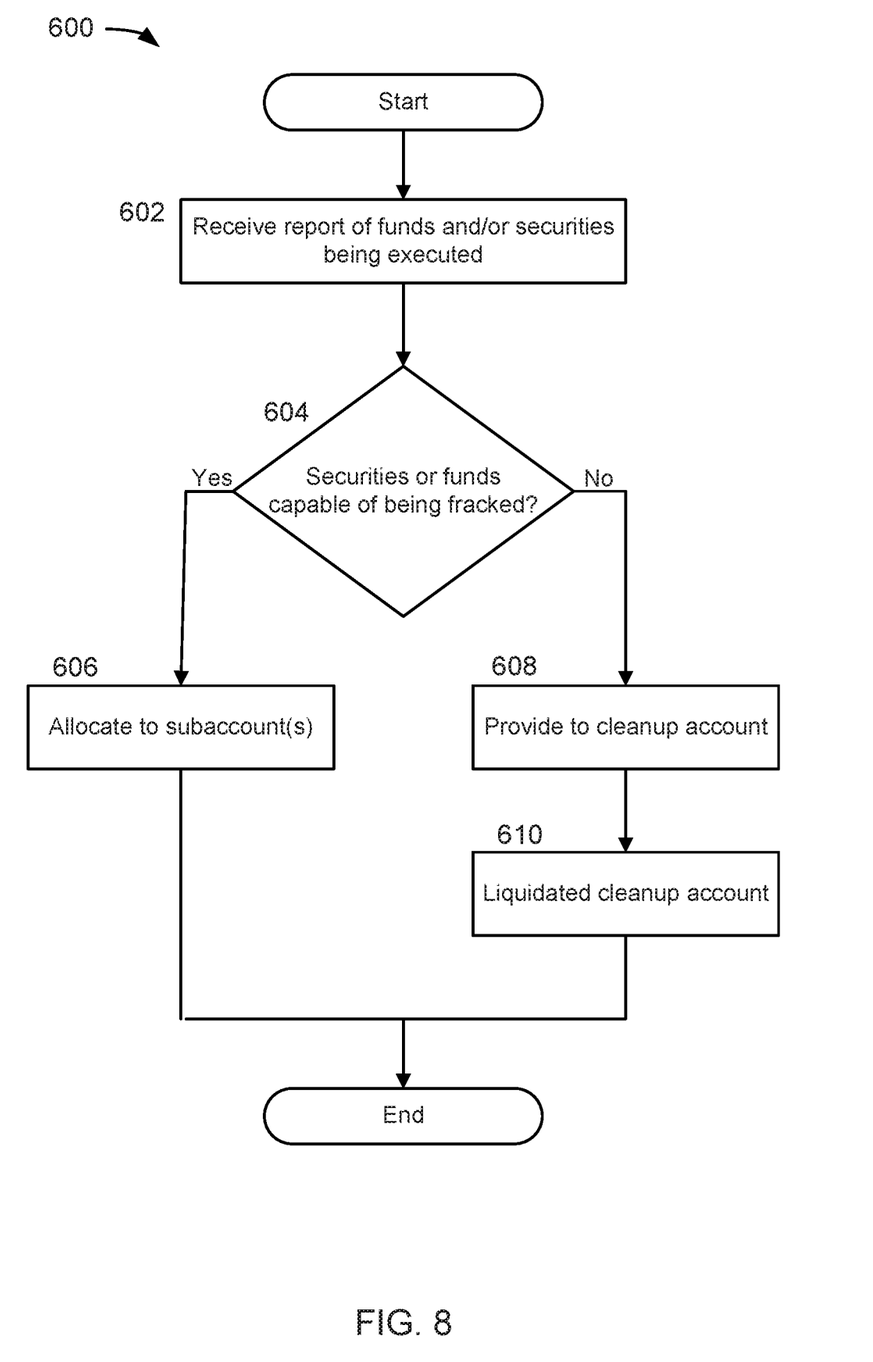
FIG. 8 depicts an exemplary embodiment of a flowchart disclosing a method for fully executing fractional shares transactions to managed accounts according to the inventive concepts disclosed herein.

FIG. 8 depicts flowchart 600 disclosing an example of a method for executing fractional shares transactions, where APU 510 may be programmed or configured with instructions corresponding to the modules embodied in flowchart 600. The method of flowchart 600 begins with module 602 with trading advisor account 520 receiving, from a communication unit of EMS 140, a report detailing the quantity of funds and/or securities executed, and the average price of that execution, in response to the trade order being entered by trading advisor account 520 to a communication unit of order gateway 130 for the execution. In some embodiments, the order could include a fractional-based buy or sell order, a notional-based buy order, and/or a notional-based sell order. In some embodiments, the communication units of order gateway 130 and the EMS 140 may be the same unit. In some embodiments, the communication units of order gateway 130 and the EMS 140 may be different units.

The method of flowchart 600 continues with module 604 with APU 510 determining whether the funds and/or securities are capable of a being fracked and, if so, then allocated to subaccounts 540 based upon allocation listing 530. If there is a sufficient quantity of the funds and/or securities that could be fracked by FPU 150, then the portion capable of being fracked may be allocated to subaccounts 540; if there is not, then the portion not capable of being fracked may be provided as "dribble" to cleanup account 550. For a portion capable of being fracked, then the method of flowchart 600 continues with module 606 with APU 510 providing such portion of the funds and/or securities to subaccounts 540. For a portion not capable of being fracked then the method of flowchart 600 proceeds to module 608 with APU 510 providing such funds and/or securities to cleanup account 550 at which time such funds and/or securities become available for liquidation by FPU 150.

For the purpose of illustration and not of limitation, assume that a first participant (e.g., a RIA) has four subaccounts 540, and that each has the same amount of funds available for trading. Assume that for the four accounts, a notional based buy order was submitted to order gateway 130 and, in response, a report indicating a quantity of 16.0019 shares has been received in module 602. Assuming allocation listing 530 directs an allocation of one-hundred percent to each account and that FPU 150 is configured to produce a lowest divisible share quantity of one ten-thousandth (or four places to the right of a decimal point), then APU 510 may allocate a quantity of 4.004 shares (i.e., a quantity capable of being fracked) to subaccounts 540, where each of the four subaccounts may receive 1.0001 shares. The remaining quantity of shares in the amount of 0.0003 shares (16.0019–16.0004) may not be capable of being fracked to the lowest divisible share quantity pursuant to APU 510 instructions; as such, APU 510 may provide this dribble to clean up account 550.

The method of flowchart 600 proceeds to module 610 with APU 150 buying and/or selling the dribble in cleanup account 550 to FPU 150 that may be configured to liquidate cleanup account 550. In the preceding illustration, FPU 150 could purchase the quantity of 0.0003 shares. In some embodiments, this may be performed on a scheduled interval. In some embodiments, the buying and/or selling of the dribble could increase and/or decrease the quantity of fractional shares, respectively, in fractional share database 158. Then, the method of flowchart 600 ends.

It should be noted that the steps of the method described above may be embodied in computer-instruction code stored in a non-transitory computer-readable medium. The method may include one or more of the steps described herein, which one or more steps may be carried out in any desired order including being carried out simultaneously with one another. For example, two or more of the steps disclosed herein may be combined in a single step and/or one or more of the steps may be carried out as two or more sub-steps. Further, steps not expressly disclosed or inherently present herein may be interspersed with or added to the steps described herein, or may be substituted for one or more of the steps described herein as will be appreciated by a person of ordinary skill in the art having the benefit of the instant disclosure.

As used herein, the term "embodiment" means an embodiment that serves to illustrate by way of example but not limitation.

It will be appreciated to those skilled in the art that the preceding examples and embodiments are exemplary and not limiting to the broad scope of the inventive concepts disclosed herein. It is intended that all modifications, permutations, enhancements, equivalents, and improvements thereto that are apparent to those skilled in the art upon a reading of the specification and a study of the drawings are included within the broad scope of the inventive concepts disclosed herein. It is therefore intended that the following appended claims include all such modifications, permutations, enhancements, equivalents, and improvements falling within the broad scope of the inventive concepts disclosed herein.

What is claimed is:

1. A method for executing a notional-based buy order through a first communication unit of a first participant, comprising:

receiving, by a processing unit including at least one processor communicatively coupled to a non-transitory processor-readable medium storing processor-executable code, a first estimated fractional share component of a notional-based buy order having a first amount, where the first estimated fractional share component is comprised of a calculated quantity, wherein the notional-based buy order is received from a first communication unit of a first participant;

providing, by the processing unit, the first estimated fractional share component to a first queue, wherein the first queue is configured to process fractional share components on a first-in-first-out basis;

recalculating, by the processing unit, the calculated quantity of the estimated fractional share component when the first estimated fractional share component has reached the top of the first queue, wherein a quantity of the estimated fractional share component is recalculated as a function of the first amount and a real-time price;

providing, by the processing unit, a second estimated fractional share component, comprised of the recalculated quantity, to a second queue after a trade of an estimated whole share component of the notional-based buy order is executed, wherein the execution of the whole share component is reported through a second communications unit of a second participant;

determining, by a balancer, whether a sufficient quantity of fractional shares is stored in a fractional shares database;

executing, by the balancer, if a sufficient quantity is stored, a buy of fractional shares from the fractional shares database, wherein the buy of the fractional shares is executed by a fracker balancer based on a user imposed parameter, wherein the fracker balancer is configured with the user imposed parameter and the user imposed parameter includes controls to adjust and set inventory risk exposure, and wherein the user imposed parameter is determined to be elected to hold no more than one share of a given security in the fractional share database and to hold no more than what is necessary to execute current orders;

determining, by the balancer, a second dollar amount for the second estimated fractional share component;

adjusting, by the balancer, the second estimated fractional share component as a function of the first amount, wherein the adjusting is performed by the fracker balancer using an adjustment factor when the second dollar amount is greater than a dollar amount of the notional-based buy order;

generating, by the balancer, a report upon the completion of the first transaction or the second transaction; and transmitting the generated report to the first participant.

2. The method of claim 1, wherein the quantity of the estimated fractional share component is recalculated as a function of the first amount and a real-time price.

3. The method of claim 1, further comprising:
determining a quantity of shares to purchase if a sufficient quantity does not exist,
purchasing the quantity of shares, and
storing the purchased quantity of shares in the fractional shares database prior to the execution of the buy of fractional shares.

4. The method of claim 3, wherein the quantity of shares to purchase is determined as a function of a quantity of fractional shares in the first queue and a quantity of shares in the second queue.

5. The method of claim 3, wherein the buy of fractional shares is executed at a price at which the whole share component was executed or a real-time price if there is a price improvement.

6. The method of claim 1, the report is included in a notional-based buy order report provided to a first communications unit of a first participant.

7. The method of claim 1, further comprising:
purchasing, from a managed account system employed by a first participant and comprised with an account processing unit, at least one fractional share from a cleanup account.

8. The method of claim 7, wherein the account processing unit is configured to execute a method for executing fractional shares transactions.

* * * * *